April 3, 1956        V. P. STEELE        2,740,558
BEVERAGE DISPENSER WITH DUPLEX STIRRER AND PUMP
Filed Oct. 6, 1954        2 Sheets-Sheet 1
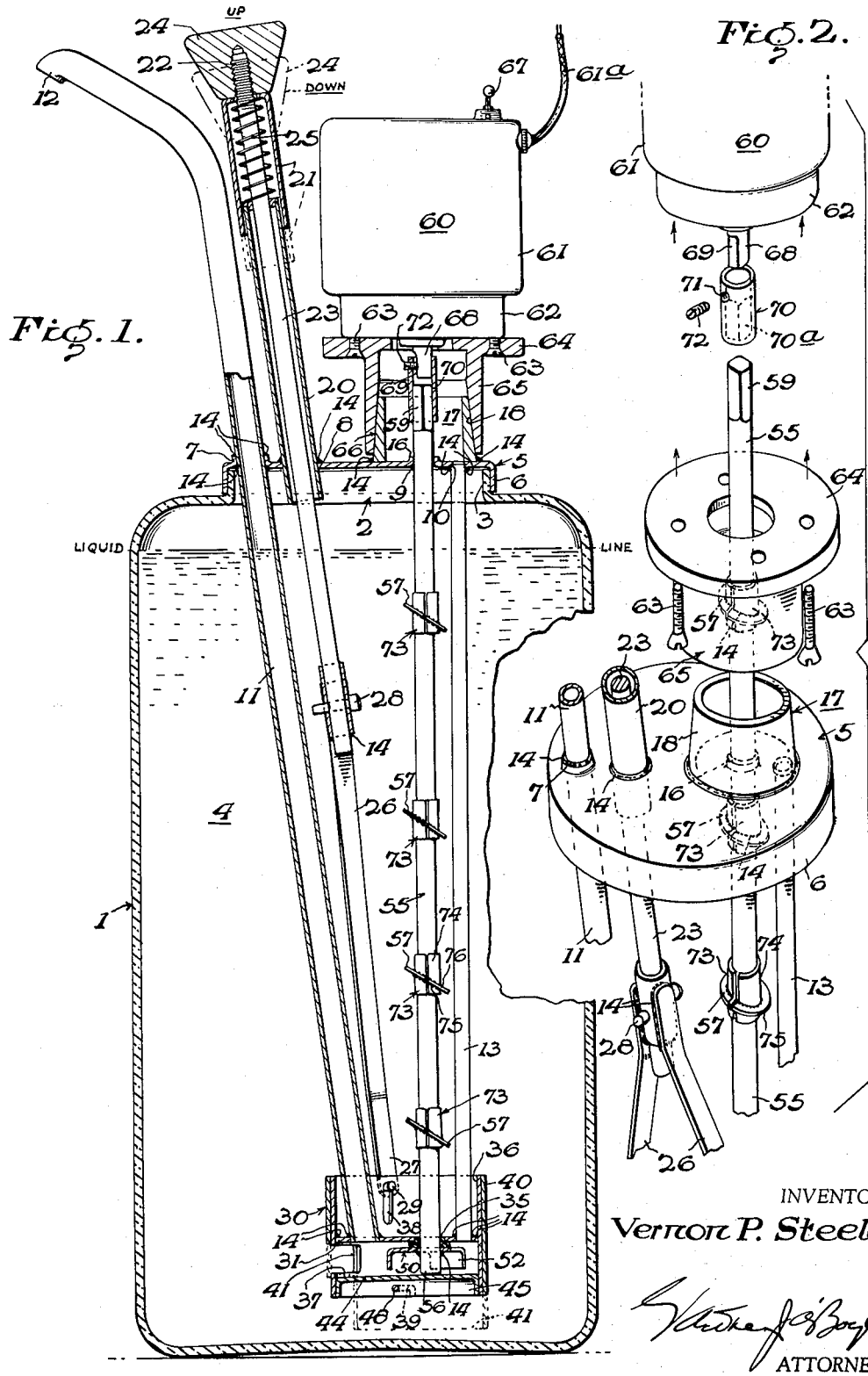
INVENTOR
Vernon P. Steele.
ATTORNEY April 3, 1956 V. P. STEELE 2,740,558
BEVERAGE DISPENSER WITH DUPLEX STIRRER AND PUMP
Filed Oct. 6, 1954 2 Sheets-Sheet 2
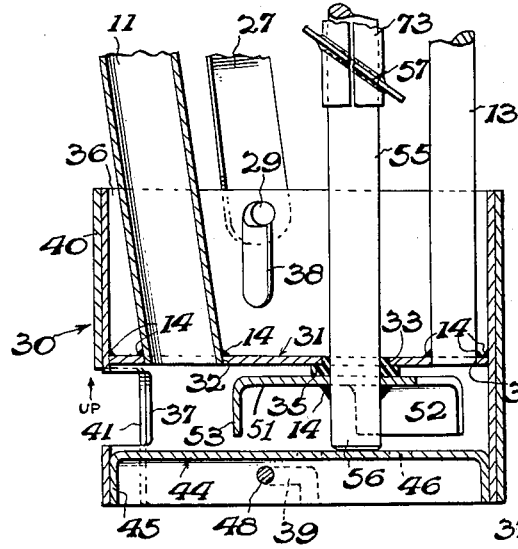
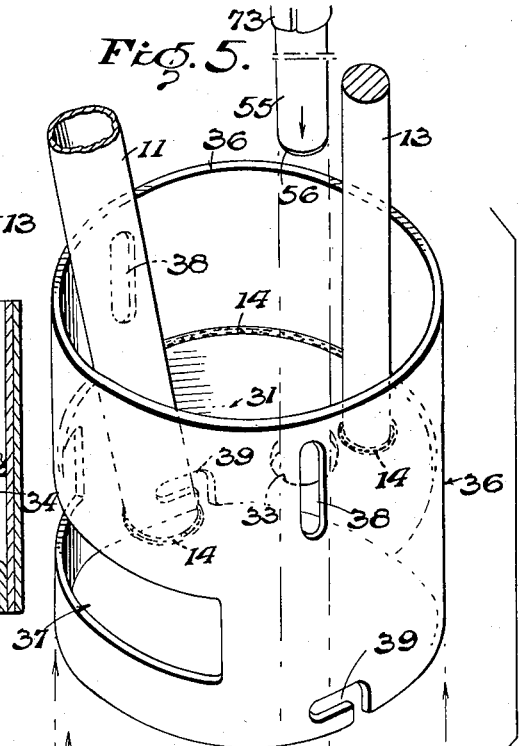
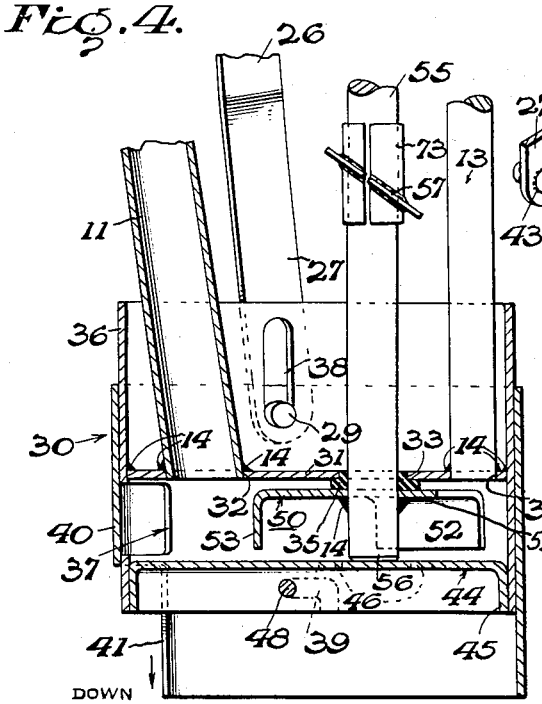
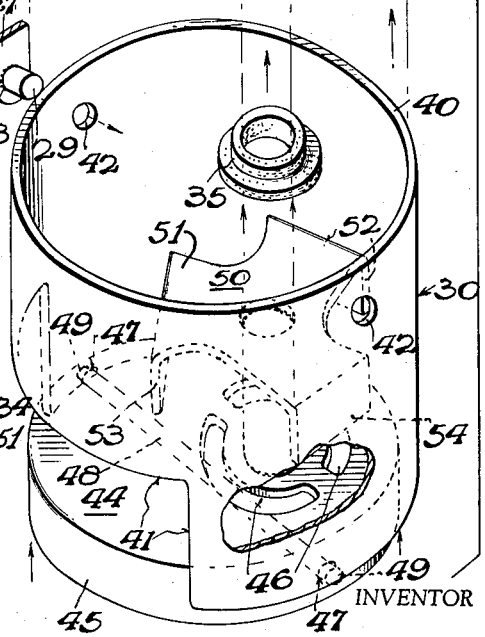
INVENTOR
Vernon P. Steele,
BY
ATTORNEY United States Patent Office 2,740,558
Patented Apr. 3, 1956

2,740,558

BEVERAGE DISPENSER WITH DUPLEX STIRRER AND PUMP

Vernon P. Steele, Noroton, Conn., assignor to Kenco Products Corporation, Englewood, N. J.

Application October 6, 1954, Serial No. 460,533

13 Claims. (Cl. 222—189)

This invention relates to refrigerated dispensers for beverages which require constant stirring to prevent settling out of pulp and other solids from the liquids. More particularly, the invention relates to a novel duplex stirrer and liquid delivery mechanism for use with such dispensers of refrigerated beverages.

The retail vending of beverages such as orangeade, pineapple, papaya, and other fruit juice products, and milk products, is characterized by the fact that the beverages must be kept refrigerated, and by the further fact that the liquids must be kept constantly agitated to prevent contained pulpy matters and other solids from precipitating out of suspension in the liquids, with resultant formation of watery, tasteless drinks.

Because of the bulk of the products handled, the containers must be large. Because of the tendency of natural food products to lose flavor on continued standing in open air, fresh fruit drinks and the like must be kept in refrigerated container. Because of sanitary regulations, all such dispensers must be completely demountable for cleaning.

To insure uniformity of individual drinks dispensed to the public, a variety of stirring mechanisms have been proposed. Hand-operated stirrers are uniformly unsatisfactory, and motor-operated devices are bulky and weighty. Added to this is the fact that hand pumps are tiring on the operatives, and uniformity of quality and quantity of drinks is not attained.

The present invention obviates the disadvantages of the prior art by providing a completely automatic stirring and delivery mechanism permanently mounted on a detachable cover of a beverage dispenser, and essentially characterized by the fact that a unitary mechanism is used for the dual function of continuously stirring the liquid and discharging the same, on demand, in controlled quantities as individual drinks.

The principles of the present invention, as will be described more in detail hereinafter, are preferably embodied in a unitary, duplex stirrer and dispensing pump mechanism, which is permanently secured to the detachable cover of a beverage dispenser. The novel device comprises the usual dispensing or discharge tube in the cover, and spacedly supporting a subjacent pump casing serving as a housing for and journalling a turbo-impeller mounted for rotation on a shaft journalled in the dispenser cover and driven by external motor means also mounted on the cover. The pump casing is an inverted cup-shaped device whose side wall is a vertically reciprocable sleeve normally held out of casing-closing position by a spring-biased actuating rod which is controlled by a handle mounted on the dispenser cover. The biasing spring controlling the actuating rod is desirably embodied in the externally mounted handle mechanism, so that it is not contacted with liquid at any time.

A special feature of the invention herein resides in the use of a manually detachable motor drive unit for actuating the drive shaft of the turbo-impeller of the combination circulator and pump unit. Additionally, the invention comprehends the fabrication and use of a novel circulating and dispensing device which is unitary in construction and operation, and in which the movable parts are readily detachable from the supporting framework, and without the use of tools.

It is therefore an object of the present invention to provide a unitary stirrer-dispensing mechanism for use with beverage dispensers.

It is a further object of the present invention to provide a duplex mechanism of the character described, comprising a turbo-impeller pump mounted to serve as both a stirring and dispensing device.

Another object of the present invention is the provision of actuating means for converting the pump from its stirring function to its dispensing function.

A further object of the present invention is the provision of motor driven turbo-impeller pump means for use with beverage dispensers, and characterized by the fact that the motor drive unit is detachably mounted on the cover of the dispenser and is manually removable and replaceable.

It is also an object of the present invention to provide a motorized juice pump having a unitary circulating and dispensing mechanism.

Yet another object of the invention is provision of reciprocable valve means for use with the novel juice pump, which valve means is detachable along with the impeller units and the valve actuating mechanism.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings like numerals refer to similar parts throughout the several views, of which Figure 1 is a vertical section of a novel pump unit in use position, certain of the actuating elements being shown in elevation;

Fig. 2 is an exploded view of the cover and motor mount with the impeller shaft and the pump actuating rod shown in elevation;

Figs. 3 and 4 are enlarged vertical sections of the pump unit in fluid circulating and fluid delivery positions, respectively, and Fig. 5 is an exploded view of the impeller pump unit with certain of the parts shown in phantom view.

Turning now to Fig. 1 of the drawings, the novel beverage dispenser is shown in combination with a beverage container 1, of glass, stainless steel, porcelain, enameled steel, or any other suitable material. The container 1 may be of any desired shape, with all corners or edges rounded to facilitate cleaning. The top of the container has a central opening 2 defined by an upstanding flange or rim 3. Where tanks are used, the tops are usually open. A body of beverage 4, is contained in the tank or container 1, and may comprise orangeade, milk, fruit juices, or the like. The container is mounted in a refrigerated or chilled compartment of a soda fountain, not shown, as they form no part of the present invention.

A cover plate 5, as shown in Figs. 1 and 2, is provided with a skirted flange 6, conformed to the flanged opening 3 of the beverage container, and is detachably fitted thereon and thereover. The cover plate 5 is provided with aligned apertures 7, 8, 9, and 10, severally receiving a delivery tube 11, the actuating rod sheath 20, impeller shaft 55, of the pump unit 30, and support rod 13. The delivery tube passes through aperture 7, and is provided with a delivery spout 12, and is silver soldered to the cover, as indicated generally at 14. The upper end of the support rod 13 is fitted in aperture 10 of the cover, and is silver soldered in place. An actuating rod sheath 20 is silver soldered to the cover, around the aperture 8. The edge of aperture 9 of the cover is peened upwardly, as indicated at 16, to form a journal bearing for the upper end of impeller shaft 55. A motor mounting ring or collar 17 is silver soldered on the cover, and is concentric with the aperture 9. The collar 17 is cylindrical and its outer surface 18 is in the form of a truncated cone, for a purpose to be described more in detail hereinafter. It will be seen that all the parts described immediately hereinabove are permanently united to the cover by silver soldering, indicated generally at 14, and form a structural entity therewith.

The pump unit 30, as shown in Figs. 1, 3, and 5, is subjoined and spacedly and fixedly secured to the cover assembly in the following manner: A mounting disk 31 is provided with diametrically aligned apertures 32, 33, and 34, severally receiving the bottom of the delivery tube, a nylon bushing 35 journaling the impeller shaft, and the bottom of support rod 13. The delivery tube and the support rod are permanently secured to the mounting disk, by silver solder, all as indicated generally at 14. The apertures 33 and 34 are on a common radius, that is they are on the opposite side of the center line from the delivery pipe aperture 32. A cylindrical inner valve sleeve or wall 36 is fitted on and over the mounting disk, and is silver soldered thereto, along the central horizontal plane, as shown in detail in Fig. 3. The member 36 is provided with a quadrantal fenestration 37, immediately subjacent the delivery tube entrant 32, the vertical center line of the fenestration coinciding with the vertical plane passing through apertures 32, 33 and 34. In a second vertical plane, at right angles to the first said vertical plane, the member 36 is provided further with diametrically opposed closed vertical slots 38, subjacent its top edge, and with opposed bayonet joint slots 39 at the bottom edge thereof.

The pump unit parts described immediately above are integral with the cover assembly which can be separately cleaned after dismounting and stripping the movable parts of the apparatus therefrom.

The demountable parts of the novel beverage dispenser herein will be seen to comprise the moving pump parts and actuator mechanism, and the turbo-impeller mechanism and demountable motor unit and support, whose construction, assembly, and cooperation with the fixed elements of the apparatus will now be described.

A valve sleeve 40 is slidably fitted for reciprocation on and over the inner valve member or body 36, and is of substantially the same height. The sleeve 40 is provided with a bottom quadrantal cut-out or fenestration 41 adapted to register with fenestration 37 in the inner sleeve when the sleeve is in its up position, the latter fenestration being closed when the sleeve is in its down position. A pair of forwardly disposed, off-center apertures 42, at the top of the sleeve, at right angles to the vertical center line of the fenestration, serve to receive actuating pins 29, to be described more in detail hereinafter.

The detachable bottom of the valve is comprised of an inverted shallow dished member 44 having a depending marginal skirt 45 and a pair of semi-circular apertures 46 forming a circular array or annulus of fluid entrants, their common center lying in the axis of the impeller shaft. The member 44 is provided further with opposed apertures 47 receiving cross-bar or actuating device 48, whose external extensions 49 form locating and locking pins adapted to be received in bayonet joint slots 39 of the fixed inner sleeve or body 36.

The valve sleeve 40 is reciprocated in the following manner:

The actuating rod sheath 20 serves as a fixed support for the telescoping upper shield 21 slidably fitted thereon and thereover. The member 21 is apertured to receive the threaded top end 22 of actuator rod 23, the end 22 also serving to threadedly receive the actuating knob or handle 24. A compression spring 25 is contained in member 21 and has bearing engagement against the top of sheath 20, and biases the actuator rod into its uppermost, valve-open position. At its lower end the actuator rod is detachably secured to the legs 27 of actuator yoke 26 by pin 28. The legs 27 are provided with fixed inturned pins 29, severally adapted to be journaled in apertures 42, of valve sleeve 40, and be reciprocably guided in slots 38 of the fixed valve sleeve 36. Thus, it will be seen that valve sleeve 40 is normally biased in up position by spring 25, and is moved into down, or valve-closing position, against the bias of the spring, by simply depressing the knob or actuator handle 24. The spring 25 can be relatively light, as its sole function is to retract a relatively weightless valve sleeve and its actuator, and the force necessary to overcome the bias of the spring will be so small as to permit of substantially finger tip control.

As noted hereinabove, fruit beverages, and the like, must be constantly stirred to prevent separation of pulpy matters and other dispersed solids. According to the present invention, this necessary function is attained by the use of a constantly rotating impeller serving as a beverage circulator when the valve is inoperative, and as a beverage pump when the pump chamber is closed.

The turbo-impeller unit of the present circulator-dispenser is designated generally by the numeral 50 and comprises a circular plate or disk member 51 with subjoined turbine blades 52, 53 and 54, as shown in Figs. 3, 4 and 5. The impeller is mounted for rotation on impeller shaft 55. As previously noted, and as shown in Fig. 4, the entrants 46 of the pump are immediately subjacent the impeller, and the bottom extension 56 of shaft 55 serves as a stop member to prevent any upward movement of closure plate 44.

It will be seen that the pump chamber formed by and between the spaced disks 31 and 44 and sleeve 36 permits free circulation of beverage by the impeller, the fluid being inspirated through entrants 46 into the pump chamber, and freely discharged therefrom through fenestration 37, whose area is appreciably greater than the combined areas of the entrants 46. The circulation of beverage in the container is further improved by providing a plurality of stirrer blades 57 on the impeller shaft, above the pump chamber, as shown. When the valve sleeve is depressed, closing the fenestration 37, the sole outlet for the pump chamber is the delivery tube 11 and spout 12, and the impeller forces the beverage therethrough in a steady stream.

It will be seen that the impeller shaft is not rigidly connected or journaled at its lower end, and its upper end 58 extends through and is journaled in the cover. The upper end is squared off, as shown at 59, adapted to receive and be driven by the output shaft of a driving motor, as will now be described.

The driving motor assembly as indicated generally by the numeral 60, is comprised of a sealed motor casing 61 having an integral subjoined reduction gear casing 62 secured by machine screws 63 onto annular platform 64 of a tapered motor mount 65, having an inner conical surface 66 tapered to fit conical surface 18 of motor supporting ring 17. The motor is provided with any suitable current leads, 61a, and a toggle switch 67. The combined motor- motor-mount assembly is adapted for drive fit, as noted, on the supporting ring, and this feature can be obtained by mere manual manipulation of the motor assembly. Conversely, when the motor and its attached mount are to be removed from the cover, the unit can be lifted by hand after tapping same to unseat the mount from the bearings.

The output shaft 68 of the motor is provided with a flat surface 69 formed by grinding. A coupling sleeve, or driving collar 70 is provided with tapped aperture 71 receiving set screw 72, which is adapted for bearing locking engagement with flat bearing surface 69 of the shaft 68, whereby the sleeve 70 is fixedly secured to the shaft and made a part of the demountable motor-motor-mount assembly. As noted previously, the upper end of the impeller shaft is squared off, as indicated at 59 (Fig. 2), and when the motor assembly is fitted in place on its supporting ring, the squared lower end 70a of sleeve 70 fits over the top of the impeller shaft. When the motor is in operation the impeller shaft will be rotated, the upper connection, as described, being made through motor shaft 68, set screw 72, sleeve 70, and angular top 59 of the impeller shaft.

As noted hereinabove, the drive shaft of the impeller may be provided with a plurality of impellers to insure continuous stirring and circulation of the upper portion of the liquid contained in the tank or other container. These devices, designated generally by the numeral 73, comprise a split cylinder 74 mounting angularly disposed fins or impeller blades 75 severally secured to the cylinders by spot weld of silver solder 76. The member 73 is adapted for sliding or drive fit on or along the impeller shaft, and can be manually adjusted for any given spacing desired.

When the novel dispensing pump mechanism is to be cleaned, the motor is shut off, and is manually removed, together with its mounting, from the cover. The cover is then lifted from the container, the removable enclosure plate or bottom of the pump chamber is removed, giving access to the impeller, which, with its drive shaft, is withdrawn from the pump, care being taken to remove the impellers 73 after the impeller shaft has cleared the cover. The impeller and its shaft being removed from the pump, the legs of the acuating yoke are sprung outwardly releasing the outer shell of the pump, which is slidingly removed from the fixed inner shell. The locking pin coupling the actuating rod and actuating yoke is removed, the yoke is withdrawn and the actuating rod and its biasing spring, together with the shield housing the spring, are removed from the supporting sheath, and the cover and permanently attached elements, including the fixed pump parts, are available for cleaning as a unit. The detached parts can be separately cleaned and replaced, in whole or in part, if found necessary. The assembly of the unit is quite simple—the actuating rod is again inserted in and through its sheath and coupled to the subjoined actuating yoke by a locking pin. The outer shell of the pump unit is fitted in place on and over the inner shell, and the legs of the actuating yoke sprung apart to permit the outer shell actuating pins to be inserted in place in the bearings in the outer shell and the guiding slots in the inner shell. The impeller shaft is then forced upwardly through the nylon bushing in the pump diaphragm, and as it is pushed upwardly the top impellers are fitted in place. When the impeller shaft is passed through the cover, the top of the impeller will have bearing engagements against the bottom of the nylon bushing and the removable bottom enclosure plate is fitted and locked in place. Thereafter the motor unit is placed on and over the top of the impeller shaft, and seated on the tapered supporting ring 17, the squared top of the shaft fitting into the conformed bottom of the coupling sleeve 70. The motor is then started, and the fluid or beverage in the container is inspirated into the pump chamber through the semi-circular openings in the removable enclosure plate, and are then forced by the large impeller out of the pump chamber through the registering fenestrations in the pump walls and into the container, setting up a whirlpool circulation of the fluid. This lateral circulation at the bottom of the container or tank is further enhanced by a vertical toroidal circulation of fluid which is established by the conjoined action of the impellers 73 spacedly mounted on the impeller shaft above the pump chamber. As a result, the liquid is constantly and uniformly flowed into and through the container, and where the walls of the container are refrigerated, the beverage in contact with the walls is constantly circulated and is uniformly cooled throughout its entire mass. For dispensing purposes, the attendant need but press the actuating knob downwardly against the bias of the spring so that the wall of the pump is closed, cutting off circulation of the beverage, and the beverage drawn into the pump chamber is discharged through the delivery tube into the individual container.

It is seen that the unitary apparatus is used for the dual purpose of uniformly circulating beverage in a container, and for discharging the same, in controlled amounts, on demand, by merely depressing the actuating knob.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

What is claimed:

1. In a sanitary fluid pump dispenser for refrigerated beverages, wherein the beverages are contained in refrigerated covered tanks, and stirrer means is provided for agitating the beverages to prevent settling out of the contained fruit solids and like mtaerials, the improvement comprising a pump chamber spacedly supported by and from a dispenser cover, the pump chamber being comprised of a cover and a reciprocable sleeve fitted thereon and thereover; a turbo-impeller mounted for rotation in the chamber; a turbo-impeller shaft journaled in the cover of the pump chamber and in the dispenser cover; motor means on the dispenser cover coupled to and driving the said shaft; a delivery spout in the dispenser cover extending downwardly to the pump casing and hermetically embouched in the fixed pump cover; a spring-biased pump handle on the dispenser cover; an actuating rod connecting the pump handle and the pump chamber sleeve, the sleeve being normally biased into raised position, whereby the impeller is laterally open to and is submerged in the fluid in the container, and serves to stir the fluid, and when the handle is depressed, against the bias of the spring, the sleeve of the pump chamber is reciprocated downwardly around the impeller to close the chamber, the fluid normally circulated in the container is driven upwardly by the impeller through the dispensing tube, release of the handle biasing the sleeve upwardly out of pump chamber-closing position, and again exposing the impeller to the circumjacent fluid, whereby the fluid is recirculated.

2. Fluid pump dispenser according to claim 1, characterized by the fact that the impeller shaft, above the pump chamber, is provided with a plurality of spacedly mounted turbo blades, whereby on rotataion of the impeller, the lowermost part of the liquid, subject to the action of the impeller, is vigorously stirred and the upper portions thereof are continuously and uniformly stirred.

3. Fluid pump dispenser according to claim 2, characterized by the fact that the spacedly mounted turbo blades are unidirectional, whereby the body of liquid is maintained in a condition of continuous toroidal flow and is vertically recirculated.

4. Fluid pump dispenser of the character described, comprising an impeller pump mounting a dispensing tube, motor means for driving the impeller, a displaceable sleeve over the pump forming a pump casing, and means for displacing the said sleeve, whereby the pump is converted to a circulating device.

5. In a beverage dispensing device, a beverage storage container, a detachable cover for the container, an outlet from the container mounted on the container cover and integral therewith, a cylindrical shell at the bottom of the outlet, an apertured bottom detachably secured to the shell, a slotted opening in the wall of the shell, a sleeve valve reciprocably fitted on and over the shell, means normally biasing the sleeve in slot-open position, a turbo-impeller mounted for rotation in the shell, a drive shaft for the impeller journalled in the cover, a motor mounted on the cover and operatively coupled to the shaft, and means for moving the sleeve into slot-closed position, whereby beverage in the container is discharged from the container.

6. In a beverage dispenser of the character described, wherein a motor-driven stirrer-impeller pump and delivery tube are spacedly subjoined to a dispenser cover, and the impeller shaft is journaled in the cover, the improvement comprising motor drive means detachably coupled to the shaft, the motor means including a motor housing and gear box, a shaft extending out of the gear box, and a tapered motor mount comprising an annular platform with an integral subjoined mounting ring coaxially disposed on and integral with the gear-box, the said motor, gear box and mounting ring forming a structural entity; the inner surface of the mounting ring being conical; and a second mounting ring fixedly secured on the cover, coaxial with the impeller shaft, the second ring having a conical outer surface adapted to receive the conical surface of the motor mounting ring in a drive fit, whereby the motor unit can be fitted in place on the cover and removed therefrom solely by hand.

7. Beverage dispenser according to claim 6, characterized by the fact that the motor drive shaft has a flat surface ground thereon, the upper end of the impeller shaft is squared to receive a coupling sleeve in drive fit, and the coupling sleeve is secured to the motor shaft by a set screw engaging the ground surface thereto.

8. Beverage dispenser according to claim 7, characterized by the fact that the motor is secured to a subjoined tapered motor mount by machine screws or the like, and the integral motor, subjoined motor mount and coupling are manually detachable, as a unit, from the mounting ring and the top of the impeller shaft.

9. A combination circulating and valved delivery pump for handling fruit juices and other beverages, comprising, in combination, an inner cylindrical shell and an outer shell slidably fitted on and over the inner shell; a foraminous bottom detachably secured in the inner shell; a conformed partition plate hermetically secured to the inner shell and spaced from the detachable bottom to form a pill-box type pump chamber therewith, the said partition plate dividing the inner shell into equal parts; a delivery tube and a diametrically opposed stay rod fixedly secured in the partition plate; mating quadrantal window openings in the inner and outer shells adjacent the delivery tube and extending substantially the full depth of the pump chamber; an impeller shaft journaled in the partition plate in alignment with the delivery tube and stay rod and adjacent the latter; a turbo-impeller mounted on the impeller shaft in the pump chamber; fluid entrants in the detachable bottom of the pump chamber subjacent the turbo-impeller; means for continuously rotating the impeller shaft; and means for reciprocating the outer sleeve, whereby when the window openings in the sleeves are in conjunction the fluid is circulated therethrough, and when the inner window is closed, the fluid is forced out of the pump chamber into the delivery tube.

10. Beverage pump according to claim 9, characterized by the fact that the support rod and delivery tube are fixedly and spacedly secured to and in a superjacent cover, together with an actuating rod sheath, and the cover detachably mounts a motor.

11. Beverage pump according to claim 10, characterized by the fact that the impeller shaft is journaled in the cover and is detachably coupled to the motor.

12. Beverage pump according to claim 10, characterized by the fact that the outer valve sleeve reciprocating means comprises an actuating yoke detachably coupled to an actuating rod reciprocably disposed in the actuating rod sheath, and an upper shield is telescoped over the sheath and is detachably secured to the actuating rod, the shield serving as a housing for a compression spring having bearing engagement with the sheath and the shield, whereby the actuating rod and yoke are normally biased upwardly with the outer valve sleeve in valve-open position, and on depression of the upper shield the valve sleeve is reciprocated into valve-closed position against the bias of the compression spring and beverage is delivered through the delivery tube.

13. Beverage pump according to claim 12 characterized by the fact that the arms of the actuating yoke are provided with coaxial locating pins journaled in diametrically opposed apertures in the outer valve sleeve, and the inner valve sleeve is provided with mating guide slots adapted to receive the reciprocating locating pins.

References Cited in the file of this patent

UNITED STATES PATENTS

| | | |
|---|---|---|
| 1,564,799 | Thornton | Dec. 8, 1925 |
| 1,930,293 | Valentine | Oct. 10, 1933 |